United States Patent Office 3,514,468
Patented May 26, 1970

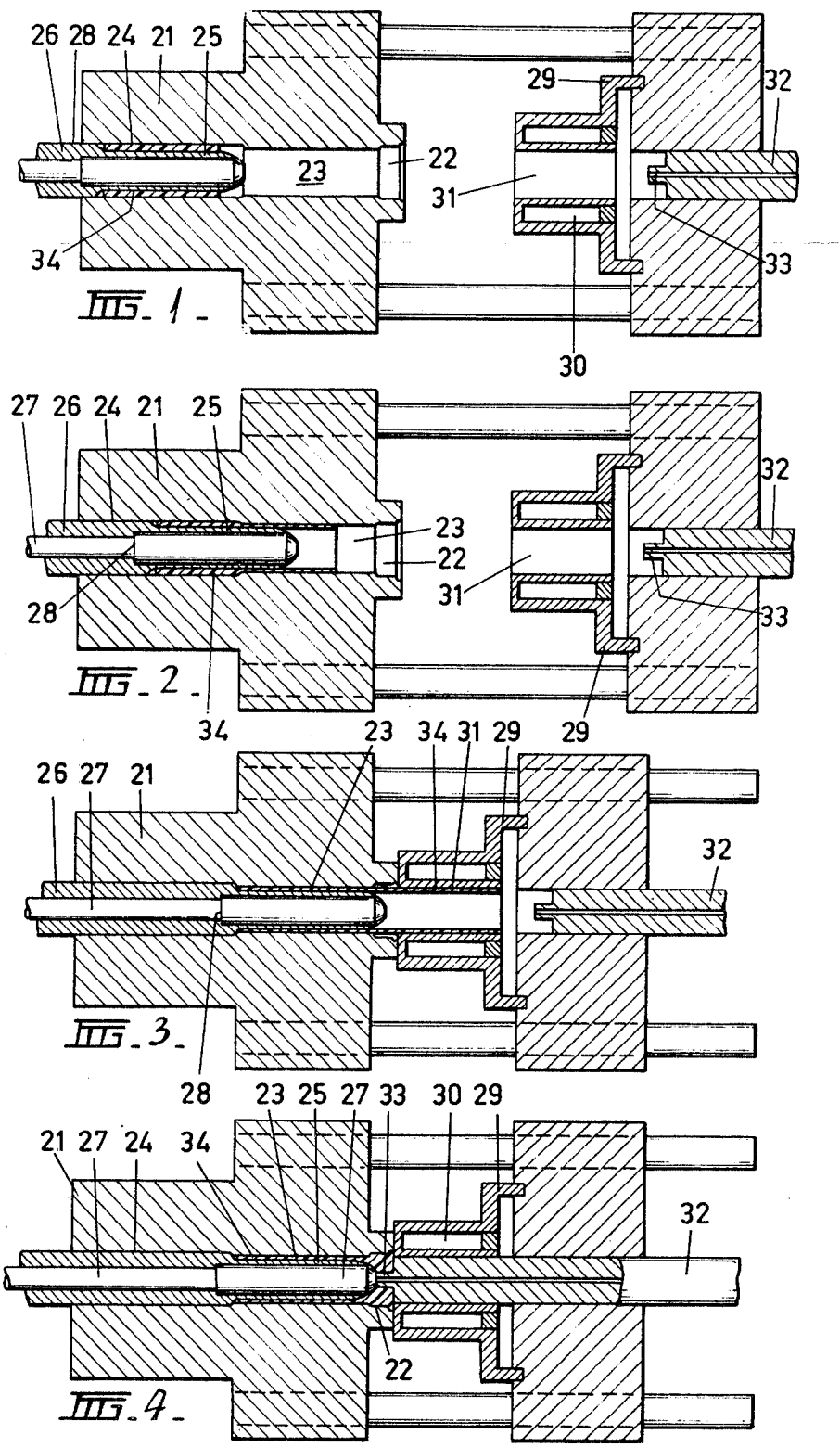

3,514,468
METHOD OF PRODUCING ORIENTED CRYSTALLINE PLASTICS
Martin R. Sutcliffe, Chelsea, Victoria, Ian M. Cavanagh, East Keilor, Victoria, and William D. Toulman, St. Kilda, Victoria, Australia, assignors to Imperial Chemical Industries of Australia and New Zealand Limited, Melbourne, Victoria, Australia, a company of Victoria
Filed Dec. 4, 1967, Ser. No. 687,890
Claims priority, application Australia, Dec. 12, 1966, 15,156/66
Int. Cl. B29d 23/00; B29c 11/00; F42b 7/06
U.S. Cl. 264—323                                              2 Claims

ABSTRACT OF THE DISCLOSURE

Crystalline plastic tubes having increased tensile strength are produced by pushing a relatively thicker walled blank through an annular die having a smaller external diameter and a smaller cross-section than the blank. Tubes suitable for use in shotgun cartridges can be produced in this way from high density polyethylene.

---

This invention relates to the manufacture of articles composed of oriented crystalline plastics. Examples of the articles with which the invention is particularly concerned are tubing, and the cylindrical portion of a shotgun cartridge case.

Cartridge cases made by simple injection moulding of high density polythene are found to perform unsatisfactorily in use. If the wall of the case is oriented either longitudinally or longitudinally and circumferentially, satisfactory cartridges result, but the methods so far proposed to achieve orientation are considered to be either too slow or too expensive to enable plastic cartridges to achieve the commercial success of which they are potentially capable.

It is the principal object of the present invention to provide a method of rapidly and economically producing on an industrial scale an article of oriented crystalline plastic.

In order to achieve this object, the present invention provides a method of producing an oriented crystalline plastic article comprising confining a one-piece cylindrical tubular blank of crystalline polymer at a temperature below its crystalline melting point, applying a longitudinal compressive force to said blank at one end thereof, permitting the polymer to flow in the direction of the force under compression through a restricted annular orifice of smaller external diameter and smaller annular cross-section area than the blank, and thereafter maintaining the polymer free from dimensional restraint.

To produce shotgun cartridges, an oriented tube resulting from the above method may be cut into appropriate lengths, each of which may be fixed to conventional metal cartridge heads thereby replacing the conventional paper tubes; or the end of an oriented plastic tube resulting from the above method may be softened by heat and then shaped as a cartridge head to thereby provide a one-piece all-plastic cartridge case; or the blank may be formed with an integral plastic cartridge head which remains unoriented while the cylindrical portion is oriented by the above method.

For cartridges, high density polyethylene or polypropylene are suitable crystalline plastics. The degrees of crystallinity as determined by various methods such as the X-ray diffraction method, is preferably as high as possible for each material; for polypropylene a high degree of isotacticity is also preferred along with maximum possible crystallinity.

Practical examples of the production of cartridge cases by the method according to this invention will now be described with reference to the accompanying drawings. In these drawings:

FIGS. 1 to 4 are longitudinal sections of one form of apparatus at successive stages in the production of a cartridge case;

Figure 5:
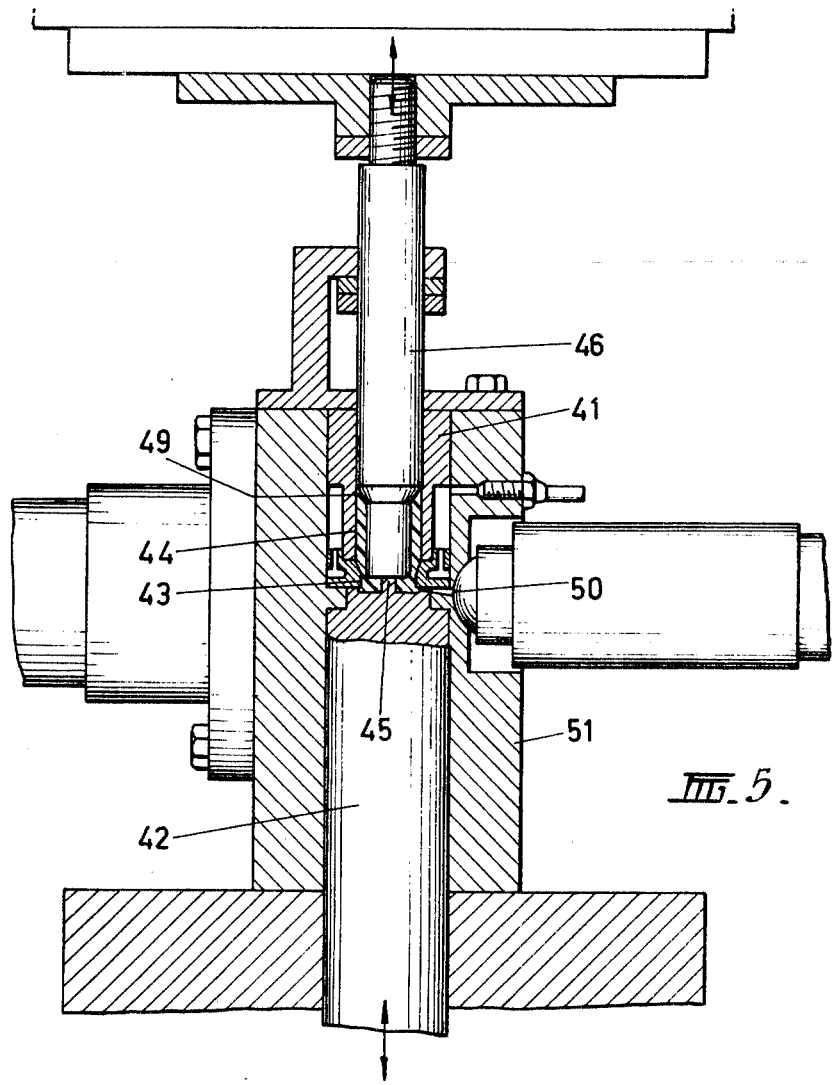
FIG. 5 is a longitudinal section of another form of apparatus.

Referring first to FIGS. 1 to 4, the apparatus there shown comprises a block 21 of metal having extending completely therethrough a circular cross-section bore comprising three axially aligned portions, the first and second of which 22 and 23 together make up the outline of the cartridge to be produced and the third 24 is of slightly larger cross-section than the portion 23. A forming sleeve, which slides within the bore, comprises a forward portion 25, of external diameter smaller than the diameter of the portion 23 of the bore by an amount equal to twice the desired thickness of the cartridge wall, integral with an axially aligned rearward portion 26 of such external diameter that it fits closely in the portion 24 of the bore. A punch 27 slides within the forming sleeve, a step being provided at 28 to enable the punch 27 to retract the sleeve.

A heating block 29, mounted for longitudinal movement to or from contact with the end of the block 21 in which the bore portion 22 is formed, comprises an annular heating element 30 arranged coaxially around a cylindrical recess 31 of diameter slightly greater than the diameter of the bore portion 23 and axially aligned with the bore.

A plunger 32 having at its forward end a central boss 33 of the same external shape as the percussion cap to be used in the finished cartridge slides neatly within the recess 31.

In operation, a tube 34 of commerciallinear polyethylene having a specific gravity between 0.942 and 0.965 was placed over the portion 25 of the forming sleeve, the thickness of the tube wall being of a thickness equal to the difference in diameter between the sleeve portion 25 and the bore portion 24. The forming sleeve was then advanced into the bore to the position shown in FIG. 1.

The crystalline melt temperature of the polyethylene, i.e., the temperature at which all crystallinity disappeared, and the polyethylene appeared clear when viewed through crossed Nicol prisms, was between 124° C. and 125° C.

The forming sleeve and punch 27 were then advanced as shown in FIG. 2, whereupon the tube 34 was compressed and forced through the clearance between the portion 25 of the forming sleeve and the portion 23 of the bore to produce a tube having thinner walls extending forwardly from the forming sleeve. This longitudinally oriented the polyethylene.

Advancement of the forming sleeve was continued until the whole of the tube 34 had been forced along the portion 23, as shown in FIG. 3. The oriented tube thus obtained could have been attached to a metal cartridge head and cut to the required length to produce a part-plastic cartridge case as already known, however in the present example the oriented tube was further processed to produce an all-plastic cartridge case.

The heating block 29 was advanced as shown in FIG. 3, so that the recess 31 surrounded the end of the tube 34, which was thereby heated and softened. The plunger 32 was then advanced as shown in FIG. 4 until the boss 33 contacted the end of the punch 27, so that the plunger 32, boss 33, punch 27, portion 25 of the forming sleeve, and portions 22 and 23 of the bore constituted a closed mould whereby the softened polyethylene of the tube 34 was formed into a cartridge head having a central recess to receive a percussion cap.

The heating block 29 was then retracted, leaving the finished cartridge case supported on the punch 27 and the forming sleeve, from which it was manually removed.

Whereas the original tube 34 had a longitudinal tensile stress of 3000 lbs./square inch, the oriented tube had a longitudinal tensile stress of 10,000 lbs./square inch.

Figure 6:
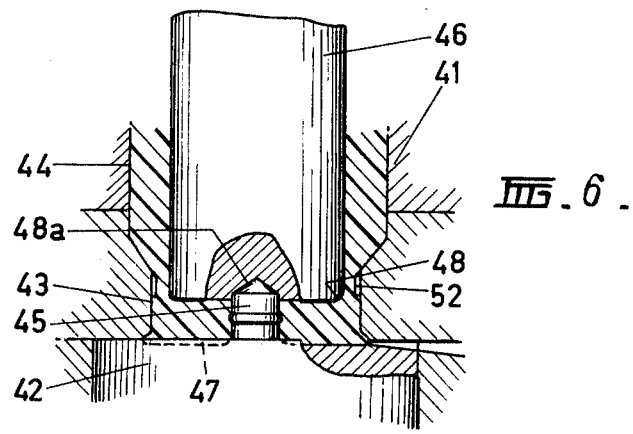
FIG. 6 is a detail view of portion of FIG. 5 on a larger scale.

Referring now to FIGS. 5 and 6, a mould is provided comprising a body 41 having a bore therethrough comprising a portion 43 shaped as a conventional cartridge head and extending symmetrically therefrom a portion 44 of larger diameter, and a backing plunger 42 which can be transported to and from the position shown where it closes the bore. The backing plunger 42 has a boss 45 projecting axially therefrom of diameter equal to the diameter of a percussion cap, and a recess 47 corresponding to the external shape of the base of the cartridge.

A plunger 46 longitudinally movable along the bore portion 44 has a rounded nose 48 of shape corresponding to the desired shape of the internal surface of the head portion of the finished cartridge case, and is provided with a shallow central recess 48a to accommodate the end of the boss 45. The maximum diameter of the nose 48 is therefore smaller than the diameter of the bore portion 43 by an amount equal to twice the desired wall thickness of the finished cartridge case. The nose 48 continues as a cylinder joining at the shoulder 49 to the remainder of the plunger 46 which has a diameter equal to the diameter of the bore portion 44.

In operation, the backing plunger 42 was brought into engagement with the body 41, the plunger 46 was advanced into contact with the boss 45, and molten polyethylene of the properties above described was injected from an injection nozzle 50 into the bore portions 43 and 44. The polyethylene was then allowed to cool and crystallize.

The plunger 46 was then advanced pushing the backing plunger 42 before it. The polyethylene within the bore portion 44 was compressed and forced through the annular clearance between the nose 48 and the bore portion 43 to produce an oriented tubular wall of the thickness required in the finished cartridge. The polyethylene originally in the bore portion 43 was free to emerge from the body 41, and constituted an unoriented cartridge head integral with the oriented tubular wall. This head and wall assembly was then removed through an appropriate opening (not shown) in the wall of the housing 51 for the backing plunger 42, and the plunger 46 was retracted. Inserts 52 in the bore portion 43 formed ribs on the external surface of the oriented tube.

A similar improvement in longitudinal tensile strength was produced in the polyethylene of the wall by this method to that experienced with the method described with reference to FIGS. 1 to 4.

If it were desired to orient the tubes circumferentially as well as longitudinally, this could be achieved with either of the above described methods by rotating the forming sleeve 25 or plunger 46 while it advances.

We claim:

1. A method of producing an oriented crystalline polymeric shotgun cartridge comprising initially positioning an inner cylindrical plunger within an outer cylindrical sleeve with an end of said plunger at the location of an abrupt restriction in internal diameter of said sleeve to form an annular substantially cylindrical space between said plunger and said sleeve having at the restriction an annular orifice of reduced external diameter relative to the external diameter of the remainder of the annular space and reduced annular cross-section relative to the cross section of the remainder of the annular space; injecting crystalline polymer into the said annular space and into engagement with at least a portion of said end of said plunger to form a tubular cartridge blank having a head portion on the end thereof; subsequently, when the temperature of the blank is below the crystalline melting point of the polymer, applying a longitudinal compressive force to said blank at the end thereof remote from said head portion by effecting relative longitudinal movement between said plunger and said sleeve; forcing the polymer to flow under compression through said annular orifice, said plunger and said sleeve moving longitudinally relative to each other at the location of said annular orifice; and thereafter maintaining the emerged polymer free from dimensional restraint.

2. A method as in claim 1 wherein said polymer is high density polyethylene.

References Cited

UNITED STATES PATENTS

| | | | |
|---|---|---|---|
| Re. 25,313 | 1/1963 | Walker | 18—19 |
| 3,189,866 | 8/1965 | Covington | 264—297 |
| 3,284,560 | 11/1966 | King | 264—292 |
| 3,086,249 | 4/1963 | Nelson | 264—294 XR |
| 3,244,781 | 5/1966 | Covington | 264—95 |
| 3,341,644 | 9/1967 | Allen | 264—97 |

ROBERT F. WHITE, Primary Examiner

R. R. KUCIA, Assistant Examiner

U.S. Cl. X.R.

264—292, 328